(12) United States Patent
English et al.

(10) Patent No.: US 7,522,043 B2
(45) Date of Patent: Apr. 21, 2009

(54) MOBILE WIRELESS MESH TECHNOLOGY FOR SHIPPING CONTAINER SECURITY

(75) Inventors: Kent L. English, St. Charles, MO (US); Christopher K. Zuver, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 11/336,126

(22) Filed: Jan. 20, 2006

(65) Prior Publication Data

US 2007/0188322 A1 Aug. 16, 2007

(51) Int. Cl.
*G08B 13/08* (2006.01)

(52) U.S. Cl. ............... 340/545.6; 340/431; 340/539.1; 340/541

(58) Field of Classification Search ........... 340/431, 340/517, 521, 539.1, 541, 545.1, 545.6
See application file for complete search history.

(56) References Cited

U.S. PATENT DOCUMENTS 6,919,803 B2 * 7/2005 Breed .................. 340/539.14
7,002,472 B2 * 2/2006 Stratmoen et al. ...... 340/539.26
7,116,230 B2 * 10/2006 Klowak ................. 340/572.1
7,323,981 B2 * 1/2008 Peel et al. ............. 340/539.13
2003/0137968 A1 7/2003 Lareau et al.
2005/0248454 A1 11/2005 Hanson et al. ......... 340/539.26

FOREIGN PATENT DOCUMENTS

WO   WO 2005/045718 A1   5/2005

OTHER PUBLICATIONS

Hackman et al., "Demo Abstract: Agile Cargo Tracking Using Mobile Agents", SENSYS '05, Nov. 2-4, 2005, San Diego, California.

* cited by examiner

*Primary Examiner*—Travis R Hunnings
(74) *Attorney, Agent, or Firm*—Ostrager Chong Flaherty & Broitman P.C.

(57) ABSTRACT

A security system for sea cargo containers wherein each container is provided with a container security device comprising a processor, a radio, a memory, a battery and one or more sensors. When the containers are within range of each other, the container security devices communicate to form an ad hoc wireless sensor network. That network communicates with a communications infrastructure, such as satellites or GSM communications means, via a gateway that aggregates data originating from the various container security devices.

17 Claims, 3 Drawing Sheets

MOBILE WIRELESS MESH TECHNOLOGY FOR SHIPPING CONTAINER SECURITY

BACKGROUND OF THE INVENTION

The present invention relates generally to the field of security and tracking. More particularly, the invention relates to marine asset security and tracking.

The worldwide ocean-going freight transportation infrastructure is vulnerable to terrorism. The open movement of containerized cargo presents an opportunity for terrorists to cause large-scale economic damage, for example, by smuggling a thermonuclear device or radioactive material for a "dirty bomb" into a target country in a shipping container. Consequently, there is a need to develop and deploy tracking and monitoring technologies at the container level to help secure the global supply chain and critical port facilities.

The U.S. Customs and Border Protection (CBP), an agency of the U.S. Department of Homeland Security, is charged with preventing terrorists and terrorist weapons from entering the United States. With nearly 7 million containers arriving in the United States annually, CBP cannot inspect every container. The majority of containers are low value with very limited monitoring capability. The chain of custody starts with security at the factory and port. Thereafter, continuous container monitoring must ensure an unbroken chain of custody.

Homeland Defense initiatives are pushing the first line of defense from American soil to foreign soil. Securing loading docks in foreign countries which are a key component to reducing the vulnerabilities to supply chain. The Homeland Defense Container Security Initiative (CSI) was devised in response to fears that sea cargo containers bound for the U.S. could be used to facilitate a terrorist attack by providing direct access to a U.S. part. By posting officials at major foreign ports and requiring the advance transmission of manifest documentation, CBP can pre-screen and clear containers bound for the U.S. before they are even loaded onto the ship.

Other components of the CSI include: (a) the use of intelligence and automated information systems to identify and target high-risk containers; (2) the use of advanced and large-scale detection technology (such as container X-ray machines and radiation detectors) to assess more quickly and reliably those containers deemed to be high-risk; and (3) the use of "smarter" more secure containers with electronic tamper-proof seals that alert authorities to tampering while the container is in transit.

It is known to attach an integrated security sensor to the wall of a tamper-evident container and then arm that security sensor after the container has been packed and sealed. Systems are presently under development for monitoring and tracking such sensors during transit of the containers. A known container security device (CSD) has a GPS receiving antenna (for receiving GPS location data), a GPS module, a Globalstar satellite transmitting antenna (for sending GPS location reports automatically, e.g., six times daily) and a satellite modem (used to establish data transfers using a communications satellite as a relay).

One proposed system for tracking sea cargo employs palm-sized CSDs that fasten to the doorjamb of most standard maritime containers. The manufacturer of the cargo inside the container arms the CSD by transmitting a unique identifier code via a wireless device. The CSD automatically communicates its status to wireless readers located in the port of entry. These communications indicate where and when the container has been opened since it was initially sealed. Communication between the wireless readers and the CSDs and all data regarding the transactions is encrypted.

Another proposed system uses intelligent processing and wireless communications systems, enabling the monitoring authority to receive reports on the global location and condition of containers. Low-earth orbiting satellites and multi-band cellular and wireless LANs will be used for global data transmission. Such a system could notify the monitoring authority within minutes of a container experiencing an abnormal event, such as unauthorized entry, mishandling, environmental extremes, route deviation or unscheduled delay, regardless of the container's location.

One problem with conventional CSDs arises when containers are stacked on a ship or in port. The CSDs of only those containers at the top of the stack have a line-of-sight to orbiting satellites. Also CSDs in the field do not communicate with each other. There is also a limited interconnection to worldwide producers of data. The CSDs send to a central location (one way) at infrequent intervals (e.g., hours or days). In addition, limited alarm verification increases false alarms. A further drawback is that alarm correlation relies on manual interaction. It is difficult to achieve a continuous record of route and container security using conventional CSDs. A further impediment to implementation of the CSI is the high recurring costs of replacing the batteries of the CSDs, which often have inadequate battery life for long ocean voyages. The high cost of communications (e.g., satellite and telephone fees) limits worldwide shipment tracking; one-way data distribution limits interconnectivity; and stale, latent data limits reliable security assessment.

There is a need for an improved security system for use with cargo containers that addresses or solves at least some of the foregoing problems.

BRIEF DESCRIPTION OF THE INVENTION

The present invention is directed to a security system for sea cargo containers wherein each container is provided with a container security device comprising a processor, a radio, a memory, a battery and one or more sensors. When the containers are within range of each other, the container security devices communicate to form an ad hoc wireless sensor network. That wireless network communicates with a communications infrastructure, such as satellite or GSM communications means, via a wireless bridge that aggregates data originating from the various container security devices and transmits that data to the communications infrastructure.

One aspect of the invention is a cargo container security system comprising: a wireless sensor network comprising a first container security device attached to a first cargo container, and a second container security device attached to a second cargo container, the first and second container security devices being in intermittent wireless communication with each other; and an aggregation device that communicates wirelessly and intermittently with the first container security device and with a communications infrastructure, the aggregation device serving as a wireless bridge for the transfer of data between the wireless sensor network and the communications infrastructure, wherein each container security device comprises a processor, a radio, a battery, a memory, and at least one sensor, and data from the second container security device can be sent to the communications infrastructure via the first container security device and the aggregation device.

Another aspect of the invention is a cargo container security system comprising: a multiplicity of container security devices, each container security device being attached to a respective cargo container, wherein each container security device comprises a processor, a radio, a battery, a memory, and at least one sensor; and an aggregation device that communicates wirelessly and intermittently with some of the container security devices and with a communications infrastructure, the aggregation device serving as a wireless bridge for the transfer of data between the container security devices and the communications infrastructure, wherein the processors are programmed to form an ad hoc wireless network whereby some of the container security devices communicate with the aggregation device directly and others of the container security devices communicate with the aggregation device only indirectly via the container security devices that communicate with the aggregation device directly.

A further aspect of the invention is a method for monitoring the security of a cargo container, comprising the following steps: placing a wireless aggregation device on a ship/harbor support structure; attaching a first container security device to a first cargo container; attaching a second container security device to a second cargo container; using the first container security device to detect an event or condition at the first cargo container; transmitting a first radio signal from the first container security device to the second container security device, wherein the first radio signal contains information indicating occurrence of the detected event or condition at the first cargo container; transmitting a second radio signal from the second container security device to the aggregation device, wherein the second radio signal contains information indicating occurrence of the detected event or condition at the first cargo container; and transmitting a signal from the aggregation device to a communications infrastructure, wherein the signal from the aggregation device contains information indicating occurrence of the detected event or condition at the first cargo container.

A further aspect of the invention is a method for monitoring the security of a multiplicity of cargo containers, comprising the following steps: (a) programming each of a multiplicity of container security devices to form an ad hoc network for communicating wirelessly with a wireless aggregation device when some but not all of the container security devices are within wireless communication range of the wireless aggregation device; (b) attaching each of the container security devices to a respective one of a multiplicity of cargo containers; (c) arranging the multiplicity of cargo containers in a plurality of stacks on a ship, on a dock or on land; (d) placing the wireless aggregation device at a location whereat the wireless aggregation device will be within wireless communication range of some of the multiplicity of container security devices; (e) acquiring sensor data from sensors that measure certain parameters in the vicinity of the container security devices; (f) processing the sensor data in the container security devices; (g) transmitting radio signals from the container security devices to the aggregation device via the ad hoc network, the radio signals including information derived by processing the sensor data and information identifying the container security devices that processed the sensor data; and (h) transmitting signals from the aggregation device that include information derived by processing the sensor data and information identifying the container security devices that processed the sensor data.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

Figure 1:
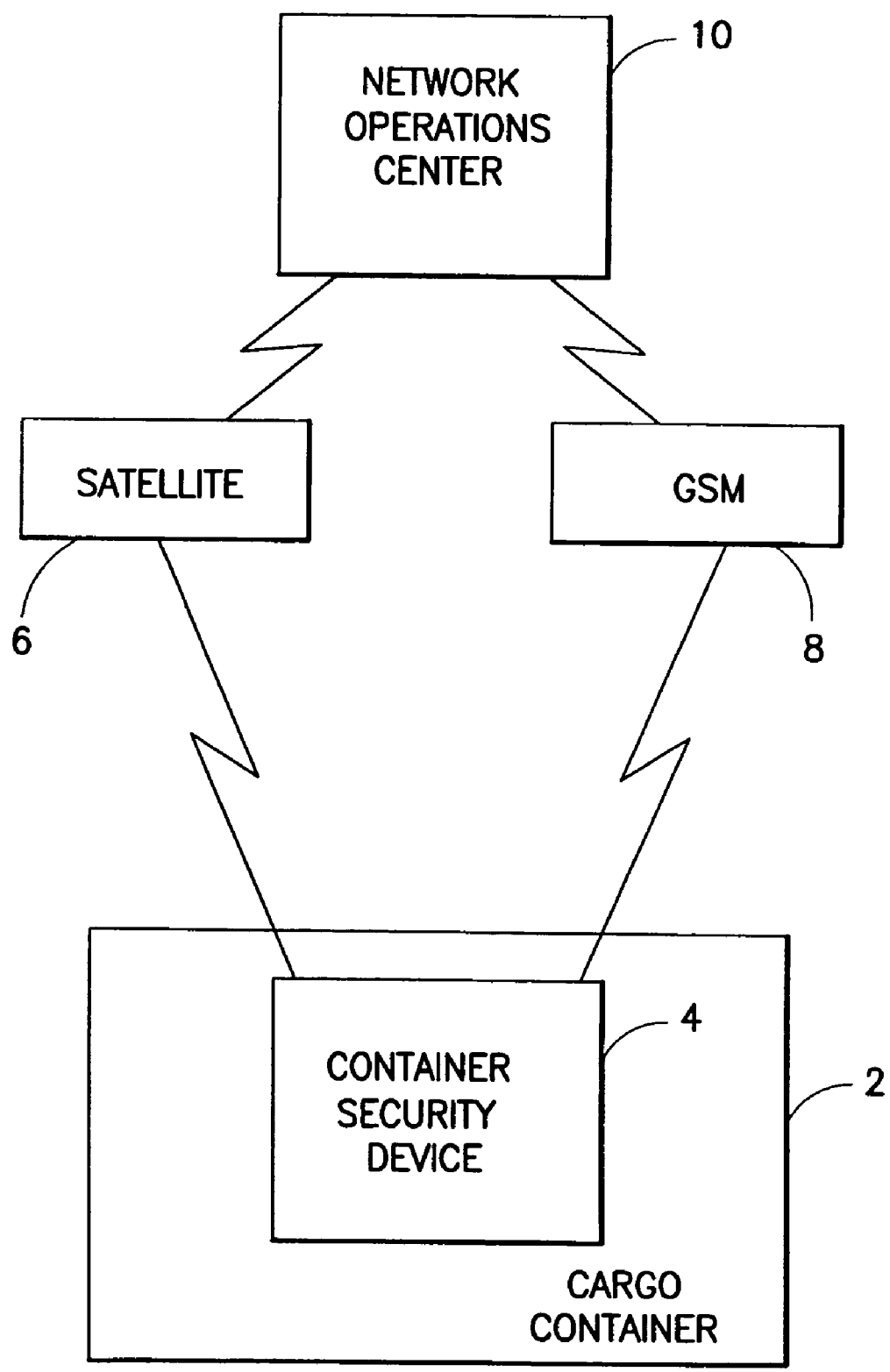
FIG. 1 is a block diagram representing a global sea cargo container security system.

FIG. 1 shows a known centralized system for maintaining security and tracking cargo containers in transit. Each cargo container 2 (only one of which is indicated in FIG. 1) has a respective container security device 4 comprising a GPS receiver and means for GSM and satellite communications. When the cargo container 2 is aboard a ship at sea, the container security device 4 communicates with a network operations center 10 via a satellite 6 (or is relayed from one satellite to another until the network operations center 10 is reached). When the cargo container 2 is on land or near land, the container security device 4 communicates with the network operations center 10 via the global system for mobile (GSM) communications. It is known to include various sensors in the container security device 4. Periodically (e.g., six times per day), the container security device 4 sends the sensor data and its GPS location, along with device identifying information, directly to the network operations center 10 via satellite or GSM communications. The container security device 4 is powered by a battery.

Figure 2:
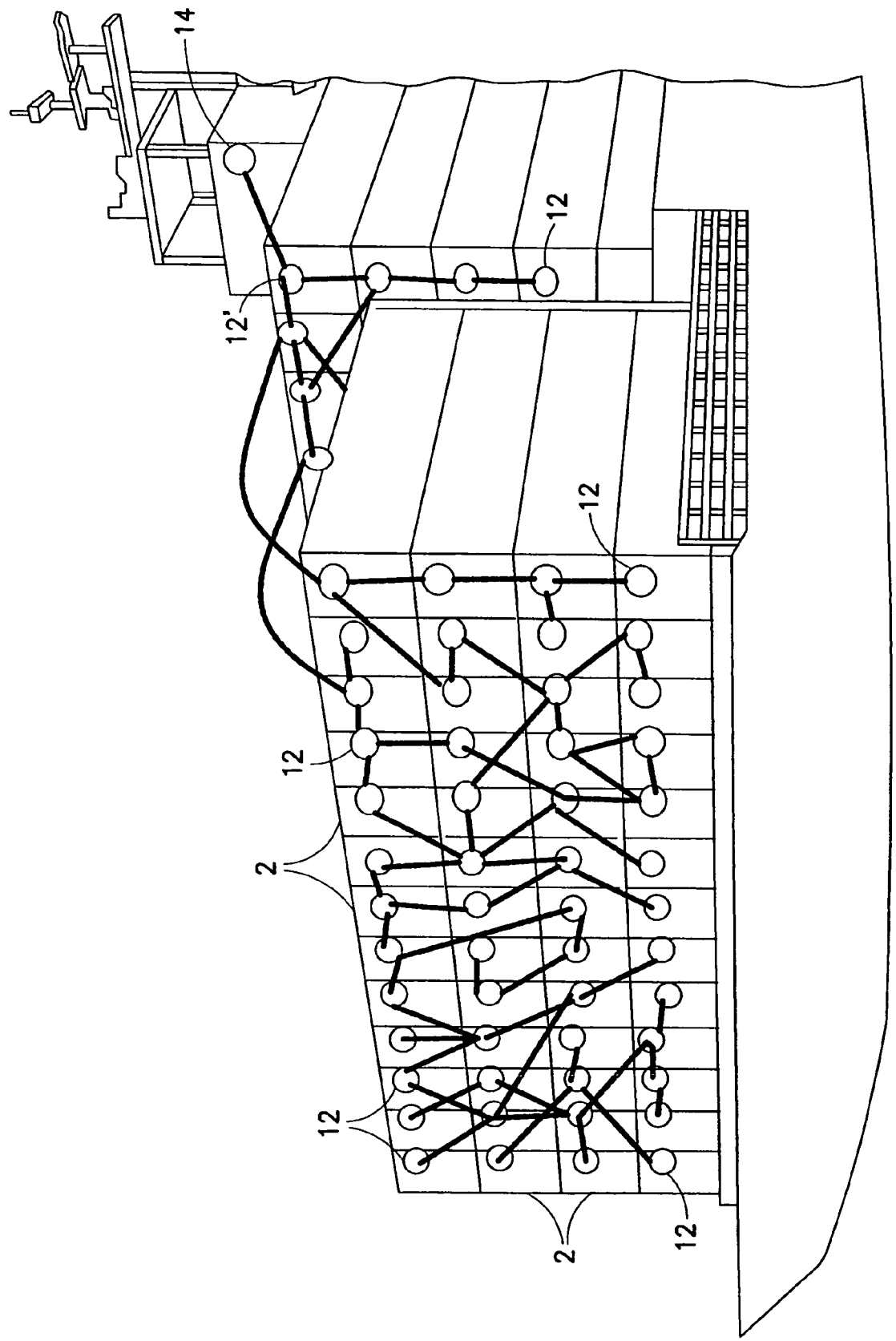
FIG. 2 is a diagram showing a wireless mesh network aboard a container ship in accordance with one embodiment of the present invention.

In accordance with the embodiments of the invention disclosed herein, distributed network management enables network centric operations using mesh networking technology. More specifically, mobile wireless sensor networks are used to provide security for sea cargo containers. One such wireless sensor network is depicted in FIG. 2, which shows a ship carrying stacks of cargo containers 2. Each cargo container 2 has a container security device that forms a respective mesh network node 12. The mesh network nodes send their sensor data to an aggregation node 14 that is carried on the ship and is not attached to a particular container. The aggregation node has means for communicating directly with the network operations center via satellite and GSM communications, and thus must be positioned on the ship at a location free of obstructions. Each mesh network node does not communicate directly with the network operations center via satellite and GSM communications. Therefore each device that forms a mesh network mode need not be provided with means for satellite and GSM communications, thereby reducing the cost of each device.

In accordance with one embodiment of the present invention, each mesh network node 12 comprises a device called a "mote". Each "mote" typically comprises a battery-powered computer with a radio link that enables the motes to communicate and exchange data with one another, and to self-organize into ad hoc networks, meaning that the motes figure out how to form the most efficient network by themselves. Similarly, the motes can reconfigure themselves to compensate for a malfunctioning mote, i.e., the wireless mesh network is self-healing. The wireless network also supports multihopping, allowing a mote out of range of the base station to pass its information from mote to mote until the data reaches the aggregation node 14. A representative ad hoc network is indicated by the boldfaced lines in FIG. 2, each boldfaced line representing a respective wireless communication between the nodes connected by that line. The node designated 12' depicts a mote that communicates with the aggregation node 14 directly, i.e., without hopping.

Each cargo container 2 is provided with its own specially programmed mote that stores information that uniquely identifies that container. An electronic cargo manifest detailing the contents of the container, a shipping manifest, and handling and alarm logs are stored as electronic data in the memory of the mote. An authorized agent carrying a handheld node tablet can communicate wirelessly with the motes. The node tablet can be used to interrogate each mote regarding the contents of the container to which that mote is attached.

Each mesh network node further comprises one or more sensors for measuring parameters such as light, temperature, barometric pressure, humidity and other environmental factors and/or for detecting light, motion, sound or vibrations. These sensors can be armed/disarmed by an authorized agent using the aforementioned node tablet or via the network operations center (NOC). The mesh network node 12 is attached to the container 2 in such a way that unauthorized intrusion or tampering with the container or its contents can be detected by the sensors. For example, the opening of the container door will cause detectable changes in the outputs of a light detector, a sound detector, an accelerometer and a magnetometer of a strategically located container security device. The sensor outputs for each mesh network node are communicated to the associated mote via an interface. The sensor data is processed by the mote (e.g., a sensor output may be tagged with data representing the time and date of receipt of the sensor output) and the information derived by processing the sensor data is stored in the mote's memory. Later the mote will send the information derived from sensor data to the aggregation node 14 either directly or via other mesh network nodes 12, as indicated by the boldfaced lines in FIG. 2. Alternatively, the motes can be interrogated by an authorized agent using a node tablet. The data retrieved from each mote, which includes data identifying the mote and data indicating possible tampering with the container to which the mote is attached, can be used by security personnel to identify high-risk containers arriving at a port.

In addition to the transmission of data from a multiplicity of cargo containers aboard a ship to a network operations center, which data may contain information indicating that a container has been tampered with, each wireless mesh network aboard a ship can send back information indicating the location of the ship and/or onboard containers using the global positioning system (GPS). In accordance with one embodiment, one or more nodes may be provided with a GPS receiver that receives GPS location radio signals from two or more satellites and then determines its global location based in part on the travel times of those received signals using triangulation. In one implementation, the aggregation node has a GPS receiver for determining the GPS location of the ship. Alternatively, one or more mesh network nodes can be provided with a GPS receiver, which would periodically send its GPS location data to the aggregation node, which would later relay that information to the network operations center via satellite or GSM communications. The aggregation node can utilize the nodes with GPS receivers to augment messages from non-GPS equipped nodes to provide increased situational awareness.

In accordance with one embodiment of the invention, each mesh network node 12 comprises a container security device attached to a respective cargo container, while the aggregation node 14 comprises a wireless intelligent switch that serves as an interface between a wireless network of container security devices and a communications infrastructure (e.g., satellite or GSM), and that also provides data services. Each container security device comprises a processor/radio board (i.e., mote) with one or more sensor boards connected thereto. The GPS module and the sensors are mounted to the sensor board(s) and communicate with the processor/radio board via an interface.

Figure 3:
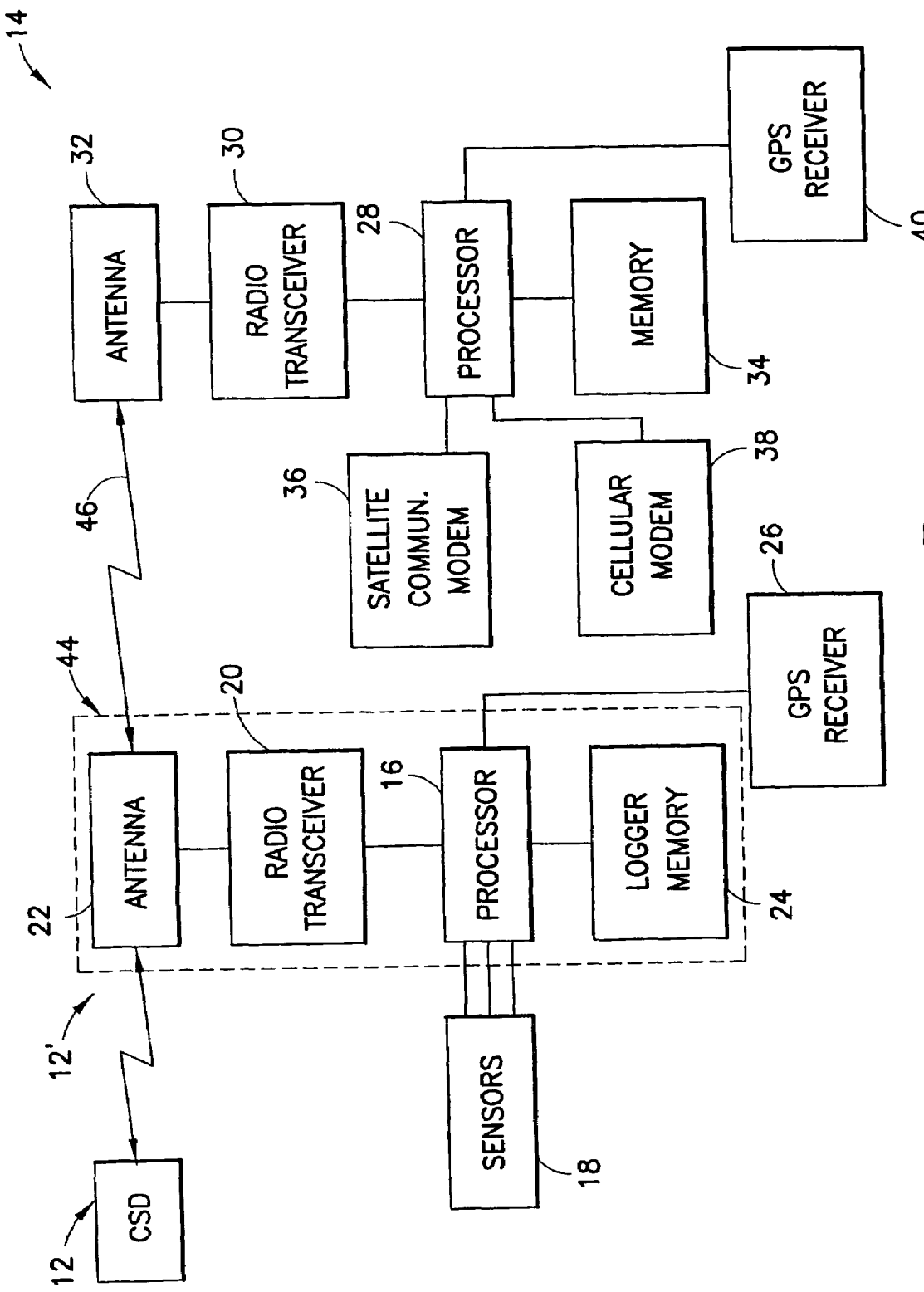
FIG. 3 is a block diagram showing components of a container security device and a gateway of a wireless mesh network in accordance with one embodiment of the present invention.

The respective major components of a mesh network node (i.e., a container security device) 12' and of an aggregation node (i.e., a wireless intelligent switch) 14 in accordance with one embodiment of the invention are shown in FIG. 3. The container security device 12 has components identical or similar to those making up the container security device 12' and communicates indirectly with the aggregation node via the container security device 12'. Each container security device comprises a mote (i.e., radio/processor board) 44 having one or more sensors 18 and a GPS receiver 26 connected thereto. As previously mentioned, the sensors and GPS receiver may be mounted to one or more sensor boards that are coupled to processor/radio board, thus forming a stack.

The processor/radio board 44 comprises a microprocessor 16 that receives, processes and stores data from the sensors 18. The sensor outputs are received at data ports of the microprocessor 16 via wired connections. The microprocessor 16 stores the processed sensor data in a logger memory 24 to create a log of sensor events, some of which may indicate or suggest that the container has been tampered with or that container security has been otherwise breached. In addition, in accordance with the embodiment shown in FIG. 3, a GPS receiver 26 sends GPS location data to the microprocessor 16. That GPS location data is also stored in logger memory 24.

At regular intervals, or in response to a query, or in response to acquisition of sensor data representing an alarm condition, each wireless container security device transmits information derived from processing the sensor data and the GPS location data to one or more wireless receiving devices located within range. The wireless receiving device may be another container security device or the aggregation device. FIG. 3 depicts the case wherein a container security device 12 is wirelessly communicating with an aggregation device 14 via another container security device 12'. The wireless communication between devices 12' and 14 is indicated by line 46 in FIG. 3. FIG. 3 depicts the situation wherein container security device 12 is out of range or obstructed from communicating wirelessly with the aggregation device 14, in which case the container security device 12 will communicate wirelessly with container security device 12'; the latter device then relays the acquired data to the aggregation device 14. The acquired data may be sent from the acquiring container security device to the aggregation device via one or more other container security devices, each of which relays the acquired data to the next device in the chain. The microprocessor 16 of the container security device 12' communicates with the aggregation device and with other container security devices within range by means of a two-way band radio transceiver 20 and a radio antenna 22, which are also mounted to the processor/radio board 44.

The types of sensors 18 mounted to the sensor boards may vary depending on the value of the cargo stored inside the container or depending on other factors. A simple sensor board can be employed for low-value cargo. More expensive sensor boards can be employed for high-value cargo, such as pharmaceuticals.

Each container security device is powered by a battery (not shown in FIG. 3). Because the mote battery cannot be recharged, it is essential that power consumption be minimized. In conventional motes, the battery is also mounted to the processor/radio board.

The microprocessor of a typical commercially available mote runs TinyOS-based code. TinyOS is an event-driven operating system that handles the power consumption and radio networking. To preserve battery power, the TinyOS operating system maintains the mote in a low-power "sleep" mode for the majority of time. Commands are only executed when an event occurs, such as the acquisition of data by a sensor or the arrival of a new message. A typical microcontroller suitable for use in a mote can operate with just one milliwatt of power when active, or 1-10 microwatts in standby mode.

The motes attached to each cargo container are programmed to pass their data from node to node in a manner similar to the way that data packets travel through routers in the Internet. This multihop approach minimizes the power consumed by the radio. The TinyOS operating system also enables the mote to process some data locally and only communicate the results of that processing when an event of interest is detected, and to discover its neighbors and perform an algorithm in concert with those motes to determine how data should be routed through the network.

In accordance with the embodiment depicted in FIG. 3, the aggregation device 14 comprises a processor 28 that controls a radio transceiver 30, a satellite communications module 36 and a cellular or GSM module 38. The aggregation device 14 is programmed to serve as an interface between the motes attached to ship-borne cargo containers and the communications infrastructure. The aggregation device 14 receives data from the container security devices via a radio antenna 32 coupled to the transceiver 30. and receives GPS location data from a GPS receiver 40. The processor 28 stores data in and retrieves data from a memory 34.

The aggregation device receives data derived from processed sensor data from the container security devices, and can send queries to the wireless mesh network (e.g., to make sure that all motes are present and accounted for). All information derived from the processing of sensor data is tagged with codes that identify the cargo containers from which the data originated. The processor 28 processes the data from individual container security devices, e.g., removing benign or redundant data and analyzing the results from multiple sensors to confirm an alarm state. For example, the sensor suite of a container security device may include light and sound detectors, an accelerometer and a magnetometer, all of the outputs of which may be analyzed to determine the status of the particular container. Also the aggregation device can interrogate container security devices of neighboring containers to confirm an intrusion. The processor 28 stores the processed data in memory 34. Because the aggregation device provides local data storage, the memory capacity of each mote on a cargo container can be small. The processor 28 sends the aggregated processed sensor data (and GPS location data) to a satellite via the satellite communications modem 36 or to a cellular tower via a cellular (i.e., GSM communications) modem 38.

While one embodiment of the invention has been disclosed in the context of a multiplicity of cargo containers stacked on a ship, the person skilled in the art will recognize that the invention also has application to cargo containers on land or docks. Containers on land or docks will communicate wirelessly with aggregation devices also located on land or docks.

Whether the cargo containers are on land, on a dock or on a ship, the method of monitoring the security of those cargo containers has certain common steps. A wireless aggregation device must be placed on or mounted to a support structure located in the vicinity of where cargo containers will be stacked and having unobstructed communications with a satellite or a cell tower. A respective wireless container security device is attached to each cargo container. Each container security device has a microprocessor and sensors for detecting events or conditions at the respective cargo container that may indicate tampering with the container or its contents. The sensors can be armed/disarmed by an authorized agent using a hand-held node tablet or via the NOC that communicates wirelessly with the container security devices.

The processors of the container security devices are programmed to form an ad hoc network for communicating wirelessly with the aggregation device when some but not all of the container security devices are within wireless communication range of the wireless aggregation device. Each microprocessor is further programmed to process sensor data acquired from the sensors that measure certain parameters in the vicinity of the container security device. At regular intervals, in response to a detected event or in reply to a query, each container security device transmits radio signals that include information derived from processing the sensor data and information identifying the container security device that processed the sensor data. The container security devices that are within range of and not obstructed from the aggregation device transmit radio signals that are received directly by the aggregation device. The container security devices that are either out of range or obstructed from the aggregation device transmit radio signals to neighboring container security devices, the latter relaying those communications directly to the aggregation device or to yet another container security device, and so forth, until information from all container security devices forming the wireless network is received by the aggregation device. The aggregation device filters out benign or redundant data and transmits the filtered data to a communications infrastructure (i.e., satellite or GSM communications). The ultimate destination of all acquired data from all wireless mesh networks is the network operations center.

While the invention has been described with reference to certain embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

In the absence of explicit language in any method claim setting forth the order in which certain steps should be performed, the method claims should not be construed to require that steps be performed in the order in which they are recited.

The invention claimed is:

1. A cargo container security system comprising:
   a wireless sensor network comprising a first container security device attached to a first cargo container, and a second container security device attached to a second cargo container, said first and second container security devices being in intermittent wireless communication with each other; and
   an aggregation device that communicates wirelessly and intermittently with said first container security device and with a communications infrastructure, said aggregation device serving as a wireless bridge for the transfer of data between said wireless sensor network and said communications infrastructure,
   wherein each container security device comprises a processor, a radio, a battery, a memory, and at least one sensor, and data from said second container security device can be sent to said communications infrastructure via said first container security device and said aggregation device, and
   wherein said aggregation device comprises a processor programmed to process data from said first and second container security devices, aggregate said processed data, and then send said aggregated processed data to said communications infrastructure, and wherein said data processing comprises the step of analyzing said data from said first and second container security devices to confirm an alarm state, and wherein said processor of said aggregation device is programmed to interrogate said second container security device to confirm an intrusion into said first cargo container indicated by data from said first container security device.

2. The system as recited in claim 1, wherein said aggregation device and/or said first container security device comprises an antenna and a module for processing GPS location signals received via said antenna.

3. The system as recited in claim 1, wherein each container security device comprises a respective detector of one or more of the following: light, temperature, barometric pressure, sound and motion.

4. The system as recited in claim 1, wherein said processor of said aggregation device is programmed to send queries to said first and second container security devices.

5. The system as recited in claim 1, wherein said processor of said aggregation device is programmed to remove benign or redundant data from the data received from said first and second container security devices.

6. The system as recited in claim 1, wherein said aggregation device comprises a module for satellite communications.

7. The system as recited in claim 1, wherein said aggregation device comprises a module for GSM communications.

8. A cargo container security system comprising:
a multiplicity of container security devices, each container security device being attached to a respective cargo container, wherein each container security device comprises a processor, a radio, a battery, a memory, and at least one sensor; and
an aggregation device that communicates wirelessly and intermittently with some of said container security devices and with a communications infrastructure, said aggregation device serving as a wireless bridge for the transfer of data between said container security devices and said communications infrastructure,
wherein said processors are programmed to form an ad hoc wireless network whereby some of said container security devices communicate with said aggregation device directly and others of said container security devices communicate with said aggregation device only indirectly via said container security devices that communicate with said aggregation device directly, and
wherein said aggregation device comprises a processor programmed to process data from said container security devices, aggregate said processed data, and then send said aggregated processed data to said communications infrastructure, and wherein said data processing comprises the step of analyzing said data from said first and second container security devices to confirm an alarm state, and wherein said processor of said aggregation device is programmed to interrogate said second container security device to confirm an intrusion into said first cargo container indicated by data from said first container security device.

9. The system as recited in claim 8, wherein said aggregation device and/or at least one of said container security devices comprises an antenna and a module for processing GPS location signals received via said antenna.

10. The system as recited in claim 8, wherein each container security device comprises a respective detector of one or more of the following: light, temperature, barometric pressure, sound and motion.

11. The system as recited in claim 8, wherein said processor of said aggregation device is programmed to send queries to said first and second container security devices.

12. The system as recited in claim 8, wherein said processor of said aggregation device is programmed to remove benign or redundant data from the data received from said first and second container security devices.

13. The system as recited in claim 8, wherein said aggregation device comprises a module for satellite communications.

14. The system as recited in claim 8, wherein said aggregation device comprises a module for GSM communications.

15. A method for monitoring the security of a cargo container, comprising the following steps:
placing a wireless aggregation device on a support structure;
attaching a first container security device to a first cargo container;
attaching a second container security device to a second cargo container;
using said first container security device to detect an event or condition at said first cargo container;
transmitting a first radio signal from said first container security device to said aggregation device, wherein said first radio signal contains information indicating occurrence of said event or condition at said first cargo container;
transmitting a second radio signal from said aggregation device to said second container security device, wherein said second radio signal contains information representing a query seeking confirmation of said occurrence of said event or condition at said first cargo container;
transmitting a third radio signal from said second container security device to said aggregation device, wherein said third radio signal contains information confirming said occurrence of said event or condition at said first cargo container; and
transmitting a signal from said aggregation device to a communications infrastructure, wherein said signal from said aggregation device includes information indicating occurrence of said event or condition at said first cargo container.

16. The method as recited in claim 15, wherein said aggregation device removes benign or redundant data from the data received from said first and second container security devices.

17. The method as recited in claim 15, comprising the following steps:
using said second container security device to detect an event or condition at said second cargo container; and
transmitting a third radio signal from said second container security device to said aggregation device, wherein said third radio signal contains information indicating occurrence of said event or condition at said second cargo container,
wherein said signal from said aggregation device also includes information indicating occurrence of said event or condition at said second cargo container.

\* \* \* \* \*